United States Patent [19]

Frederick et al.

[11] Patent Number: 4,832,837

[45] Date of Patent: May 23, 1989

[54] APPARATUS FOR AUGMENTING SEPARATION OF OIL AND WATER

[76] Inventors: Loren D. Frederick, 10907 S. Knoxville, Tulsa, Okla. 74129; Claud W. Walker, Rt. 2, Box 201, Portales, N. Mex. 88130; Clark L. Daywalt, 6703 E. 27 St., Tulsa, Okla. 74129

[21] Appl. No.: 37,432

[22] Filed: Apr. 13, 1987

[51] Int. Cl.$^4$ .............................................. B01D 17/04
[52] U.S. Cl. ................................... 210/153; 210/541; 210/DIG. 5; 210/708; 252/349
[58] Field of Search ......... 210/767, 153, 541, DIG. 5, 210/708; 422/180, 211; 502/427; 366/336, 337, 338, 340; 252/349

[56] References Cited

U.S. PATENT DOCUMENTS

| 3,431,082 | 3/1969 | Sellin | 422/211 |
|---|---|---|---|
| 3,460,612 | 8/1969 | Valyi | 422/211 |
| 3,972,712 | 8/1976 | Renschen | 420/482 |
| 4,080,282 | 3/1978 | Cronauer et al. | 422/211 |
| 4,188,309 | 2/1980 | Volker et al. | 422/177 |
| 4,235,846 | 11/1980 | Abthoff et al. | 422/180 |

FOREIGN PATENT DOCUMENTS 1144715 3/1985 U.S.S.R. .............................. 366/340

OTHER PUBLICATIONS

The Condensed Chemical Dictionary, Eighth Edition, Van Nostrand Reinhold Co. Pub., 1971, pp. 177, 840, 841.

Primary Examiner—Benoit Castel
Attorney, Agent, or Firm—Head & Johnson

[57] ABSTRACT

An apparatus for use in augmenting the separation of oil and water flowing comingled in a stream having a conduit through which the stream of comingled water and oil passes, an assembly of nodules formed of catalytic metal alloy, the nodules being generally cylindrical and having longitudinal notches on the external cylindrical surfaces and the nodules being arranged in subassemblies, each subassembly being formed of three nodules affixed to each other in a layer such that a longitudinal notch of each nodule mates with a longitudinal notch of the other two nodules to provide a central opening through the subassembly, and a central axial shaft received within the central opening retaining a plurality of the subassemblies. The complete assembly is positioned within the conduit so as to be engaged by the water and oil flowing therethrough. Each nodules being formed of an alloy of copper, zinc, nickel, lead and tin which augments the separation of the oil and water.

5 Claims, 2 Drawing Sheets

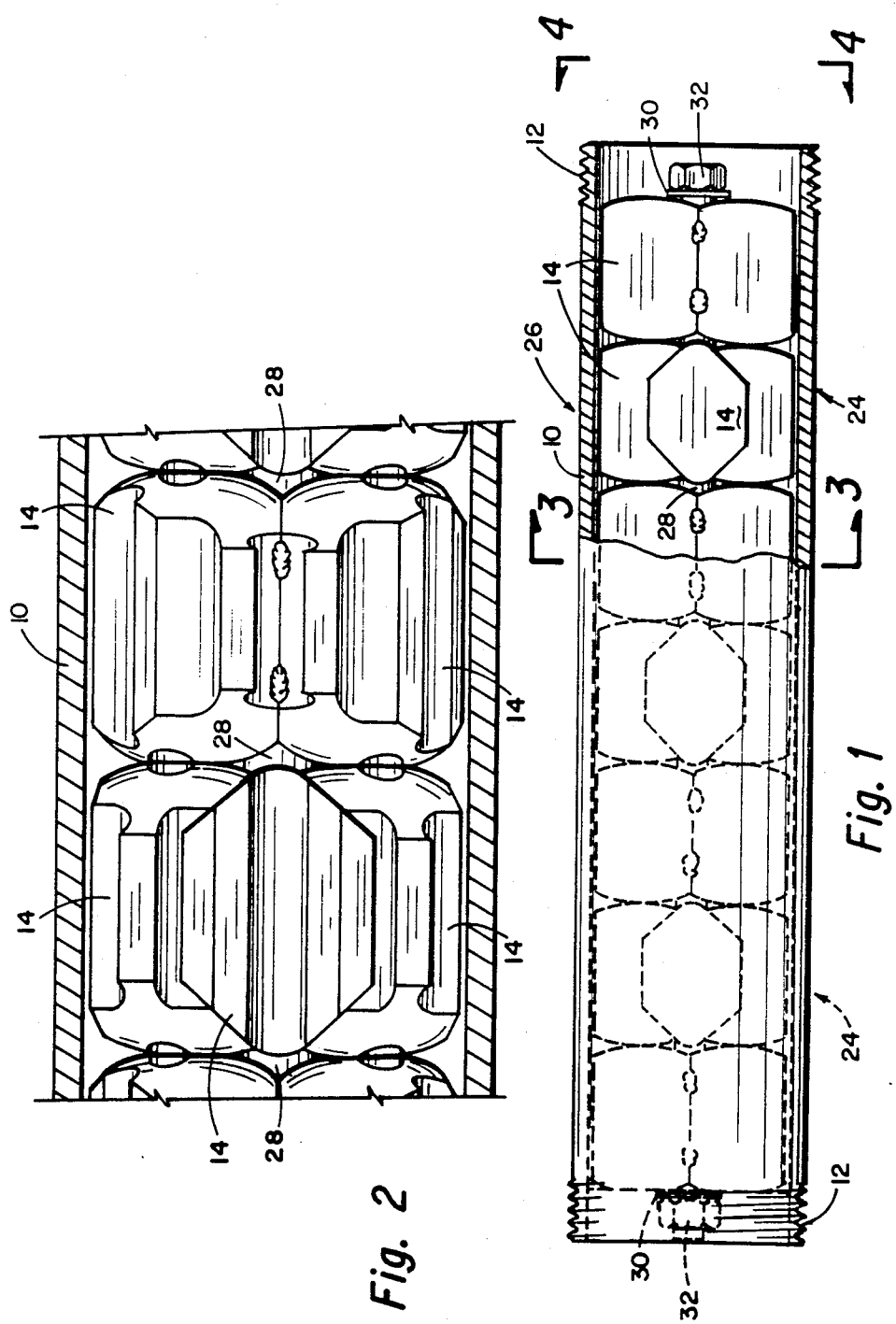

APPARATUS FOR AUGMENTING SEPARATION OF OIL AND WATER

BACKGROUND OF THE INVENTION

In industry it is frequently important to be able to separate oil and water flowing comingled in a stream. In some instances the comingled oil and water is in the form of an emulsion. A standard technique for separating oil and water is to pass the comingled stream into a separating vessel wherein a quiescent zone is established so that oil, being of lower specific gravity than water, rises. After sufficient time the emulsion will eventually separate into its two major components of water and oil. However, some comingled streams are so tenaciously emulsified that even after relatively long quiescent periods, the water and oil remains unseparated.

In order to assist in separating oil and water it is a typical practice to heat the emulsion. As the temperature of the emulsion increases the water and oil more readily separate. However, in some instances even heating the emulsion is not sufficient to permit complete separation of the water and oil.

SUMMARY OF THE INVENTION

The present invention provides a passive system for augmenting the separation of water and oil. More particularly, the present invention provides a conduit through which the emulsion passes including means of exposing the emulsion to catalytic metal nodules causing a catalytic action which augments the separation of water and oil. While the present invention is not a separator of oil and water, that is, it does not provide a vessel having an outlet for oil and an outlet for water, it does provide a conduit through which an emulsion flows and which the oil and water therein may thereafter be more effectively separated. The present invention is intended primarily to precede a standard oil and water separator, such as typically utilized in the petroleum industry.

In practice of the invention a conduit is employed which may be of steel, either standard steel or galvanized steel, or of plastic, all as commonly employed in industry, and particularly in the petroleum industry. The conduit may be of relatively small diameter such as two inches or of relatively large diameter such as six or eight inches or greater.

Retained within the conduit is an assembly made up of individual nodules each formed of a catalytic metal alloy. Each of the nodules is of generally cylindrical shape and has spaced apart parallel longitudinal notches on the external cylindrical surface. Each of the notches is in a plane of the nodule cylindrical axis. Each of the nodules has an axial opening therethrough coincident with the cylindrical axis.

The nodules are arranged into subassemblies. Each subassembly is formed of three nodules affixed to each other, such as by welding, forming a layer. The nodules are arranged such that a longitudinal slot of each nodule mates with a longitudinal slot of the other nodules to provide a central opening through the subassembly. The outside diameter of each subassembly is less than the internal diameter of the conduit. An assembly is formed by passing an elongated central shaft through the opening formed in each subassembly. By means of a bolt at each end of the shaft the subassemblies are held together forming a complete assembly of nodules of catalytic metal and the assembly is retained within a conduit.

The catalytic metal of which each of the nodules is formed consists of a mixture of copper, zinc, nickel, and tin. In the preferred arrangement the zinc is about 1 to 10 per cent, the copper about 40 to 60 per cent, the nickel about 5 to 25 per cent, the lead about 2 to 15 per cent and the tin about 1 to 10 per cent. In other instances the catalytic alloy can include trace elements of iron, antimony, sulfur and manganese.

The use of catalytic metals to treat fluids is known. An example is U.S. Pat. No. 3,486,999 issued to Kraft entitled "Fluid Stabilizer".

A better and more complete understanding of the present invention will be had by reference to the following description and claims, taken in conjunction with the attached drawings.

DESCRIPTION OF THE DRAWINGS

FIG. 1 is an elevational view of an apparatus for use in augmenting separation of oil and water flowing comingled in a stream and showing a conduit, in part broken away, to reveal an assembly of nodules of catalytic metal retained within the conduit.

FIG. 2 is an enlarged fractional view of a portion of the conduit of this invention with two full subassemblies of nodules shown within the conduit.

DETAILED DESCRIPTION OF THE PREFERRED EMBODIMENT

Figure 3:
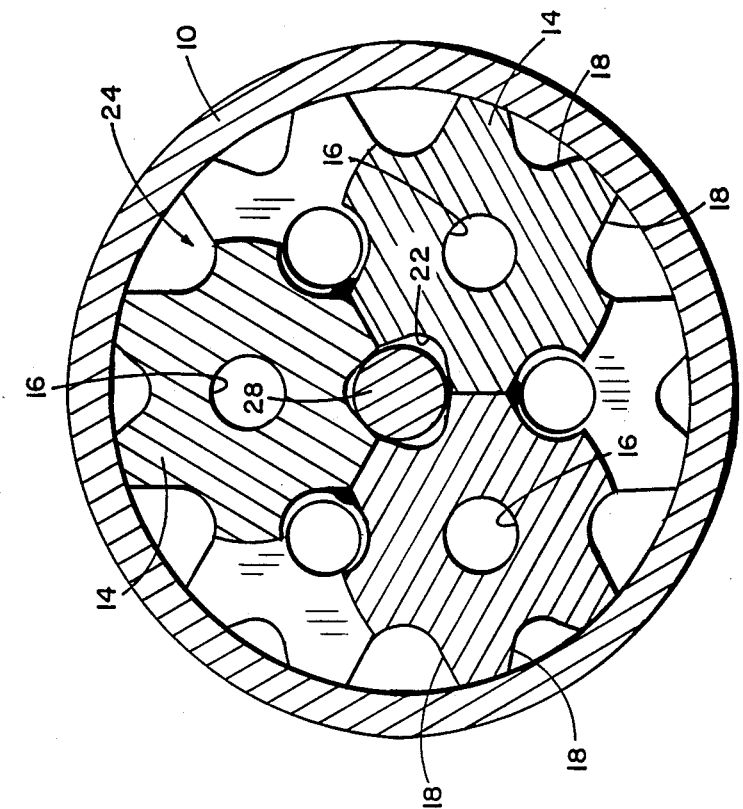
FIG. 3 is a cross-sectional view taken along the line 3—3 of FIG. 1.
Figure 4:
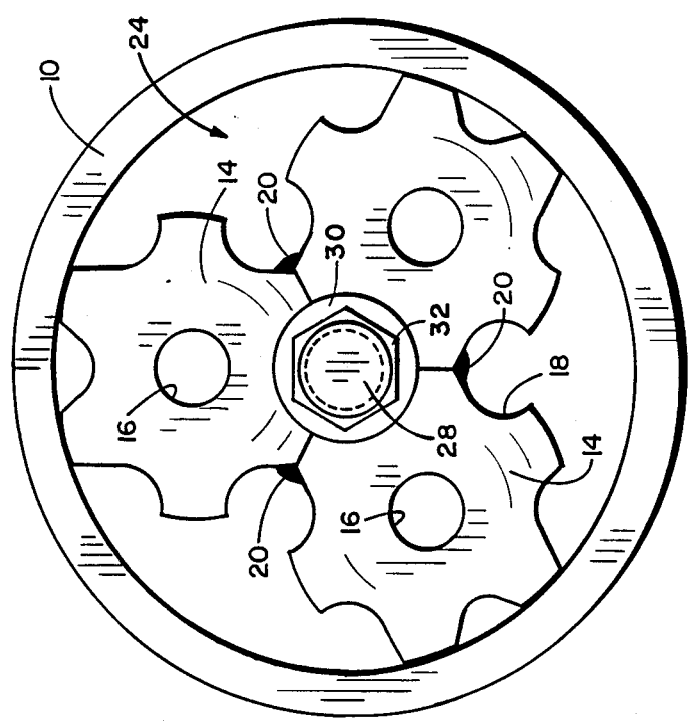
FIG. 4 is a cross-sectional view taken along the line 4—4 of FIG. 1.

Referring to the drawing, a preferred embodiment of the invention is illustrated. A conduit 10 is shown, in FIG. 1, in elevational view and partially in cross-section. In FIGS. 2 through 4 the conduit is shown in cross-section. The conduit 10 may be of a variety of sizes and need only be that which is sufficient to carry the flow of fluid having comingled oil and water therein through the conduit. Thus, the conduit 10 may be small in diameter, such as one inch or less or larger in diameter such as 10 or 12 inches or the like—all depending upon the quantity of fluid flow which must be treated. The conduit 10 may be of metal, such as steel, or may be of galvanized steel or any of the other typical metals of which conduit or pipes are formed. In addition, the conduit 10, when used in low pressure applications, may be of plastic.

Conduit 10 has external threads on each end thereof as a means of attaching it to piping by which fluid is caused to flow through the conduit.

Positioned within the conduit 10 is an assembly of nodules of catalytic metal. Each of the nodules 14 is of generally cylindrical configuration. Each nodule has a central opening 16 therethrough which is coincident with the cylindrical axis.

Formed on the external cylindrical surface of each of the nodules are paralleled longitudinal notches 18. Each of the notches has a generally semi-circular, cross-sectional shape and extends the full length of each of the nodules 14.

The modules are arranged in subassemblies of three modules each. FIG. 1 shows an assembly made up of seven subassemblies. Each subassembly forms a layer of an entire assembly. The subassemblies are formed by positioning three nodules together, each such that an elongated notch 18 therein is adjacent the notch of the other two nodules. The subassemblies are preferably formed such as by welding 20 and by the arrangement of notches a central passageway 22 is formed.

A subassembly, consisting of three nodules welded together, is indicated by the number 24.

An assembly is formed by securing together two or more subassemblies. FIG. 1 shows an assembly formed by securing together seven subassemblies 24 to form an entire assembly generally indicated by the numeral 26. The subassemblies are held together to form an assembly by passing an elongated central shaft 28 through the central passageways 22 of each of the subassemblies 24. The central shaft 28 has threads at each end and each end receives a washer 30 and nut 32.

The subassembly is positioned within conduit 10 and the conduit is then ready to receive the flow of fluid therethrough. Fluid flows past and around each of the nodules 14. By the employment of central openings 14 and the longitudinal notches 18 the cross-sectional area of each nodule exposed to fluid flowing through conduit 10 is greatly increased.

In a preferred arrangement, each subassembly is positioned on the central shaft 60° out of register with the next adjacent subassembly.

Each of the nodules 14 is formed of a catalytic metal alloy composition which consists of a mixture of the following: copper, zinc, nickel, lead and tin. In the preferred arrangement each of the nodules is formed of a metal alloy having the following percentages by weight: copper about 40 to 60 per cent; zinc about 1 to 10 per cent; nickel about 5 to 25 per cent; lead about 2 to 15 per cent; and tin about 1 to 10 per cent.

In some applications the use of a trace element in the metal alloy of each nodule will be desired. The trace elements may be selected from: iron, antimony, sulfur and manganese and mixtures of these.

As the comingled water and oil flows through conduit 10 it is exposed to the catalytic action of the nodules. The catalytic action causes a reorientation of the molecular structure of the water and oil so as to reduce the affinity of water and oil to each other. This catalytic action causes the emulsion to be more easily deemulsified. Obviously, the water and oil flowing into one end of conduit 10 will flow out the other end since there is no provision for physically separating these two liquids within the conduit, however, the function of the device of this invention is to augment the separation—not make the separation. The present invention would typically be used in advance of an oil and water separator when the invention is applied in the petroleum industry. By passing fluid first through conduit 10 and then into an oil/water separator, the separation takes place much more efficaciously and with less heat required and in reduced times. Thus, the effectiveness of an oil/water separator, regardless of its shape or configuration or method of operation, is enhanced by the method of the apparatus of the present invention in which the fluid to be separated into oil and water components first flows through the conduit 10 and is exposed to the catalytic action of the metal of which the nodules are formed.

The apparatus thus is a passive, non-sacrificial, catalytic device for augmenting the separation of water and oil flowing comingled in a stream and the separation is enhanced whether or not the comingled stream is in the form of an emulsion or otherwise.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for use in augmenting separation of oil and water flowing comingled in a stream comprising:

a conduit through which the stream of comingled water and oil passes;

an assembly of nodules each formed of a catalytic metal alloy composition consisting essentially of a mixture of the metals: copper, zinc, nickel, lead and tin, each nodule being of generally cylindrical shape and having spaced apart paralleled longitudinal notches on the external cylindrical surface, the notches being in planes of the nodule cylindrical axis, and each nodule having an axial opening therethrough coincident with the cylindrical axis, the nodules being arranged into subassemblies, each subassembly being formed of three nodules affixed to each other in a layer and arranged such that a said longitudinal notch of each module mates with a said longitudinal notch of the other nodules to provide a central opening through the subassembly, the outside diameter of each subassembly being less than the internal diameter of said conduit;

an elongated central shaft having a first end and a second end, the shaft receiving said central openings of a plurality of said subassemblies, wherein said subassemblies are arranged in layers on said central shaft to form an assembly; and means at said first and second ends of said central shaft to retain said subassemblies thereon, the retained subassemblies being positioned within said conduit.

2. An apparatus according to claim 1 wherein said nodules are affixed in subassemblies by welding each of the three nodules in each subassembly to the adjacent nodules.

3. An apparatus according to claim 1 wherein each subassembly is positioned on said elongated shaft 60° out of register with the next adjacent subassembly.

4. An apparatus according to claim 1 wherein said metals are in the following percentages by weight: copper about 40 to 60 per cent; zinc about 1 to 10 per cent; nickel about 5 to 25 per cent; lead about 2 to 15 per cent and tin about 1 to 10 per cent.

5. The apparatus according to claim 4 wherein the composition of each of said nodules includes at least one trace element selected from the group consisting of: iron, antimony, sulfur and manganese.

* * * * *